(12) United States Patent
Royt

(10) Patent No.: US 11,046,233 B1
(45) Date of Patent: Jun. 29, 2021

(54) CARGO LASHING FITTING

(71) Applicant: Peck & Hale, L.L.C., West Sayville, NY (US)

(72) Inventor: Joseph Royt, Fresh Meadows, NY (US)

(73) Assignee: Peck & Hale, L.L.C., West Sayville, NY (US)

( * ) Notice: Subject to any disclaimer, the term of this patent is extended or adjusted under 35 U.S.C. 154(b) by 83 days.

(21) Appl. No.: 16/718,037

(22) Filed: Dec. 17, 2019

Related U.S. Application Data

(60) Provisional application No. 62/781,367, filed on Dec. 18, 2018.

(51) Int. Cl.
*B60P 7/08* (2006.01)

(52) U.S. Cl.
CPC .................. *B60P 7/0807* (2013.01)

(58) Field of Classification Search
CPC ...... Y10T 24/4773; B60P 7/0807; B60P 7/08; F16B 45/00
USPC ......... 410/105, 106, 109, 110, 112–114, 116
See application file for complete search history.

(56) References Cited

U.S. PATENT DOCUMENTS

| | | |
|---|---|---|
| 2,843,060 A | 7/1958 | Sladek |
| 2,952,946 A | 9/1960 | Lucas |
| 2,962,245 A | 11/1960 | Molzan |
| 3,014,436 A * | 12/1961 | Johnson ............... B60P 7/0815 410/113 |
| 3,233,319 A | 2/1966 | Jensen |
| 3,556,457 A | 1/1971 | Patnaude |
| 3,647,172 A | 3/1972 | van der Molen |
| 3,776,169 A | 12/1973 | Strecker |
| 3,860,209 A | 1/1975 | Strecker |
| 3,888,190 A | 6/1975 | Bigge |
| 3,927,623 A | 12/1975 | Caron |
| 3,973,684 A | 8/1976 | Di Martino |
| 4,091,744 A | 5/1978 | Crissy et al. |
| 4,096,816 A | 6/1978 | Patterson, III |
| 4,400,856 A | 8/1983 | Tseung |
| 4,457,650 A | 7/1984 | Tseung |
| 4,645,392 A | 2/1987 | Takaguchi |
| 4,877,361 A | 10/1989 | DeRosa et al. |
| 4,907,921 A * | 3/1990 | Akright ............... B61D 45/001 410/111 |
| 5,823,588 A | 10/1998 | Morghen |
| 6,422,795 B2 | 7/2002 | Holt et al. |
| 8,075,232 B2 * | 12/2011 | Le ........................ B60P 7/0807 410/106 |
| 8,197,166 B2 | 6/2012 | Stull et al. |

(Continued)

FOREIGN PATENT DOCUMENTS

WO   2011090430   7/2011

OTHER PUBLICATIONS

Pacific Marine & Industrial, Helicopter Tie Down Web Pages, Jun. 3, 2010.

*Primary Examiner* — Stephen T Gordon
(74) *Attorney, Agent, or Firm* — Schroeder Law PC

(57) ABSTRACT

A cargo lashing fitting for affixing to a deck of a transportation vehicle including a housing sized for insertion within an opening in the deck and compatible for securement to the deck, a securing plate removably positionable within the housing, and a plurality of locking inserts for retaining the securing plate within the housing. In one preferred embodiment, both the housing and securing plate are formed of aluminum.

13 Claims, 5 Drawing Sheets

(56) References Cited

U.S. PATENT DOCUMENTS

| | | |
|---|---|---|
| 8,360,385 B2 | 1/2013 | Burg et al. |
| 8,505,868 B2 | 8/2013 | Silvio et al. |
| 8,568,070 B2 | 10/2013 | Meszaros |
| 8,814,125 B2 | 8/2014 | Silvio et al. |
| 9,340,142 B1 | 5/2016 | Belkin et al. |
| 2012/0107067 A1* | 5/2012 | Meszaros ............. B60P 7/0807 410/101 |

* cited by examiner

CARGO LASHING FITTING

BACKGROUND OF THE INVENTION

The present invention relates to maritime transportation of cargo and, more particularly, to a cargo lashing fitting affixed to the deck of a vessel for securing of cargo.

Transportation of cargo requires securing systems which include devices that ensure that such cargo remains safely stowed and stationary during transit. In this regard, the deck(s) of the transportation vehicles, e.g., ship, railcar, etc., typically include a plurality of cargo lashing fittings, often referred to as sockets or socket assemblies.

The maritime transportation of cargo requires securing systems which include devices that can support and transfer the very high inertial forces experienced as a result of the ship's dynamics and environmental conditions. These high forces often dictate that the fitting affixed to the vessel be made of properly designed and treated steel.

As ships are being designed to be lighter, faster and more economical, aluminum alloy structure is becoming more common, including for large commercial and military vessels. This usage of aluminum alloy for the deck increases the difficulty of designing and installing a fitting that will handle and properly transfer loads to the ship's structure. First, the fitting must have the capability of being welded to the aluminum alloy deck of the ship. Second, the lashing fixture in the fitting has typically been made from alloy steel to withstand the high stresses generated during transportation. The fitting must therefore be capable of safely transferring the load received from the cargo through the steel lashing fixture, through the body of the fitting, and into the aluminum alloy deck.

In addition, prior art fittings are typically installed as an integrated unit. This means that if the fitting is damaged and/or worn, the entire fitting must be "cut" out of the deck of the ship. This is, of course, a time consuming, intricate, and costly procedure. There may also be applications where the preferred lashing fixture (e.g., cloverleaf vs. crossbar vs. other) varies depending on the nature of the application.

Attempts have been made to provide a fitting having a removable/replaceable lashing fixture. However, these prior art fittings typically require a plurality of fasteners that must be removed for extraction. As a result, these prior art fittings typically require extended time to complete the removal/replacement.

There is therefore a need in the art for a cargo lashing fitting which is adapted for installation in an aluminum deck of a vessel, and which provides a lashing fixture which may be removed/replaced without flame cutting of the entire fitting from the aluminum deck. There is a further need in the art for a fitting which provides a lashing fixture which may be removed/replaced in a shortened time.

SUMMARY OF THE INVENTION

The present invention, which addresses the needs of the prior art, provides a cargo lashing fitting for affixing to a deck of a transportation vehicle. The deck includes at least one opening therein. The fitting is configured to cooperate with an engagement end of a lashing gear assembly. The fitting includes a housing sized for insertion within the opening in the deck. The housing defines outer and inner circumferentially-extending walls. The outer wall is configured for securement to the deck. The housing includes a circumferentially-extending flange located at an end thereof and having a plurality of shoulders spaced thereabout. The shoulders definine a plurality of notches therebetween. The shoulders further definine an opening. The inner wall of the housing includes support structure positioned thereabout. The fitting further includes a securing plate removably positionable within the housing. The securing plate includes a plurality of locking feet positioned thereabout and offset therefrom. The locking feet are oriented to substantially align with the notches in the housing to allow the securing plate to be positioned in and removed from the housing. The locking feet have an outer diameter sized to engage and rest upon the support structure located on the inner wall of the housing. Finally, the fitting includes a plurality of locking inserts sized for insertion within the notches and sized to contact the edges of the locking feet when the securing plate is oriented to circumferentially align the locking feet with the shoulders whereby the securing plate is retained within the housing.

As a result, the present invention a cargo lashing fitting which is adapted for installation in an aluminum deck of a vessel, and which provides a lashing fixture which may be removed/replaced without flame cutting of the entire fitting from the aluminum deck. The present invention further provides a fitting in which the lashing fixture may be removed/replaced in a shortened time period.

DETAILED DESCRIPTION OF THE INVENTION

Figure 1:
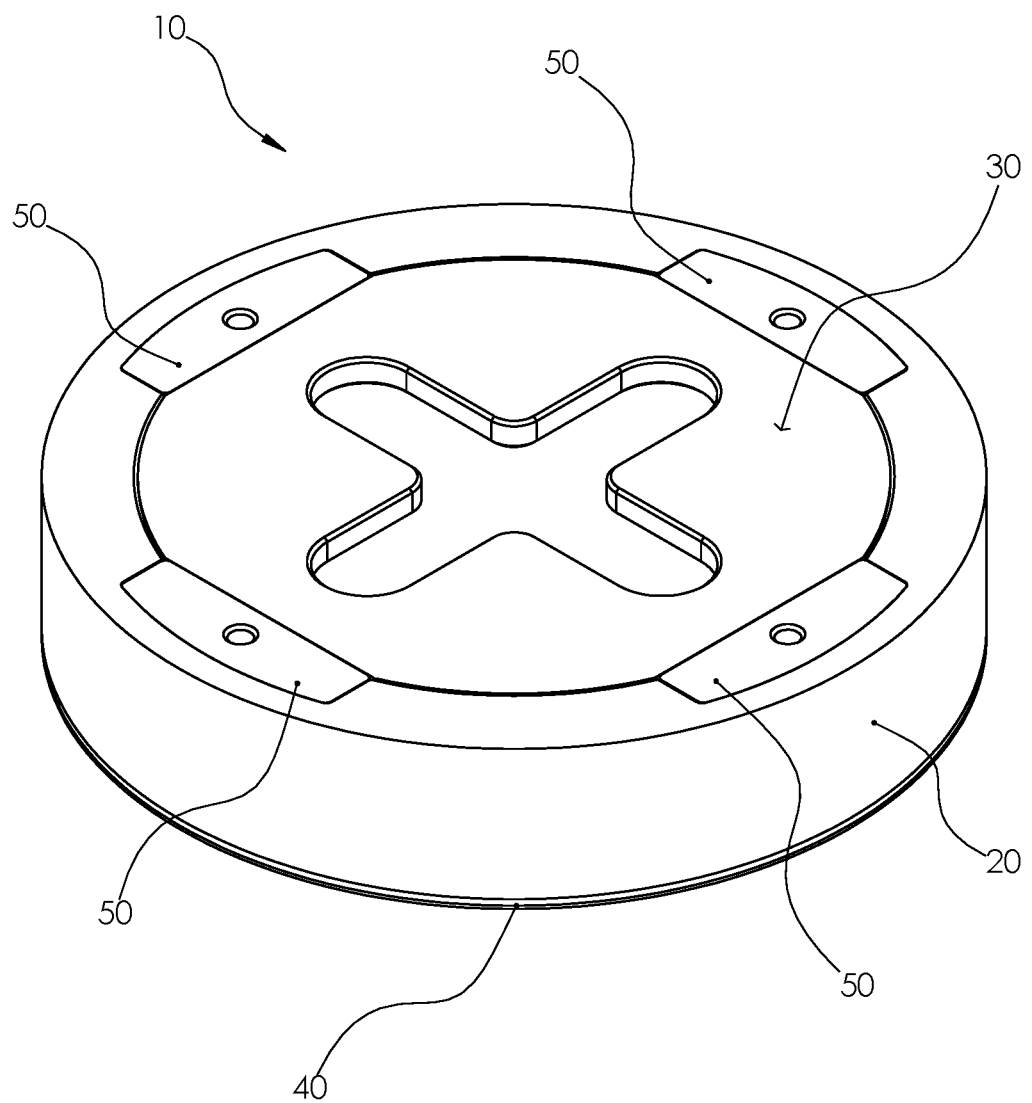
FIG. 1 is a top perspective view of a cargo lashing fitting according to the present invention.
Figure 2:
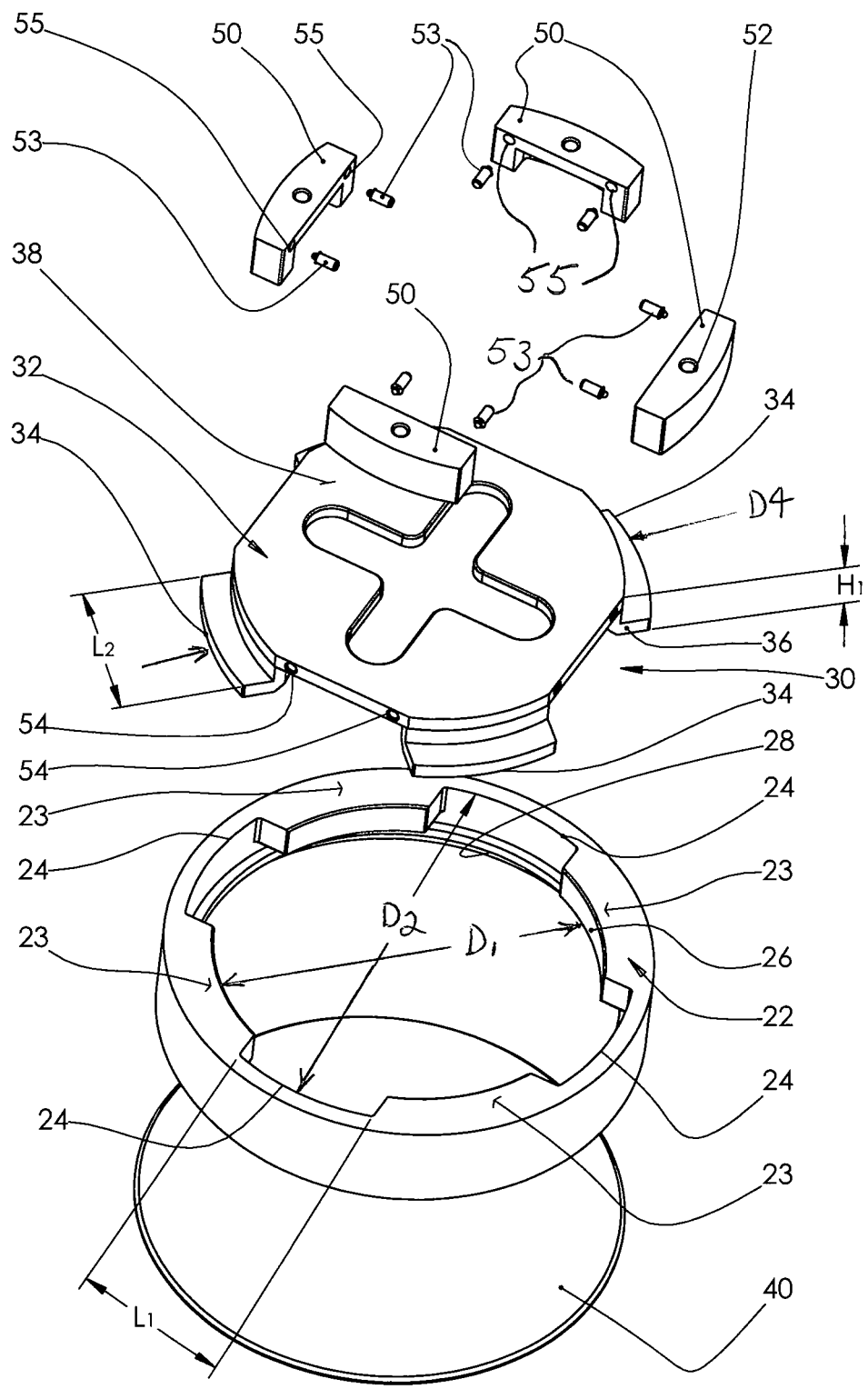
FIG. 2 is an exploded perspective view of the fitting of FIG. 1.
Figure 3:
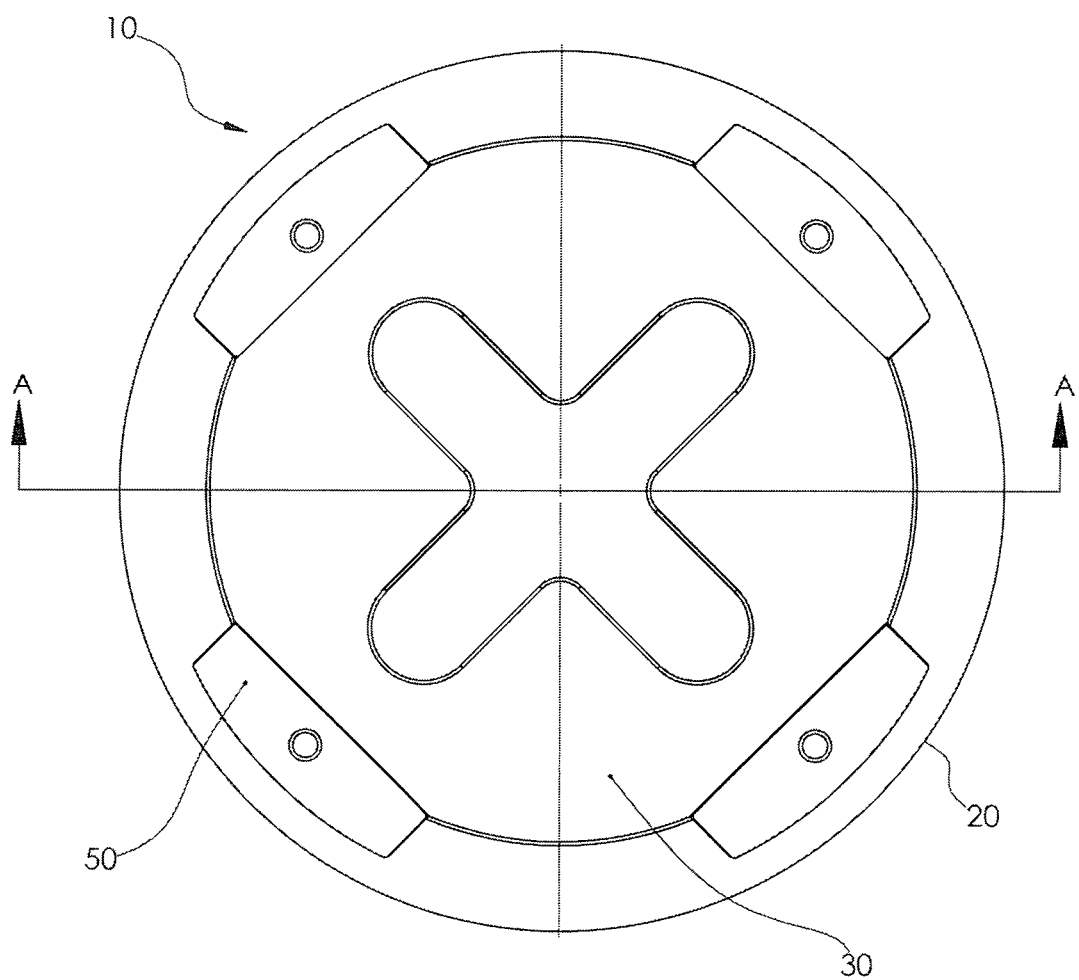
FIG. 3 is a top view of the fitting of FIG. 1.
Figure 3A:
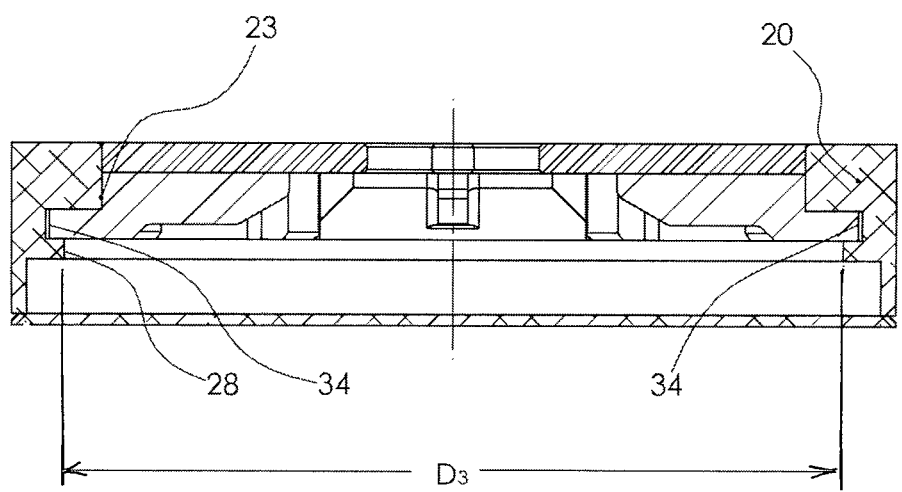
FIG. 3A is a cross-sectional view taken along lines A-A of FIG. 3.

A cargo lashing fitting, i.e., socket assembly 10, formed in accordance with the present invention, is shown in FIGS. 1 to 3A. Socket assembly 10 includes a cylindrical-shaped ring 20 having a circumferentially-extending notched upper flange 22 defining a plurality of equally-spaced shoulders 23, notches 24 and a central generally round opening 26. Opening 26 defines a diameter D1 between opposing shoulders 23, while notches 24 define a diameter D2 across ring 20. Each of notches 24 defines an accurate length L1. Ring 20 further includes an inner circumferentially-extending lip 28 (best seen in FIG. 3A) defining a diameter D3 thereacross. Ring 20 is preferably formed of an aluminum alloy compatible with welding the deck of a vessel.

Socket assembly 10 further includes a lashing fixture, e.g., cloverleaf plate 30. It is contemplated herein that the lashing fixture can be formed with other configurations for engaging various securing gear. Plate 30 is preferably an integrally-formed component, made from a material compatible with the corresponding lashing gear. In one preferred embodiment, plate 30 is formed from steel, aluminum or another suitable material. Although aluminum has not typically been a preferred material for lashing fixtures which are permanently installed within a fitting, the removability/replacement aspect of the lashing fixture in the present invention allows aluminum to be used as the fixture material, if desired. Although the duty cycle of an aluminum plate may be shorter than a steel plate, the ability to quickly change the fixture with minimum cost and/or effort makes aluminum a suitable material in many applications.

Plate 30 includes a substantially planar body 32 having a cloverleaf opening formed therethrough. Plate 30 further includes a plurality of locking feet 34 which are equally spaced thereabout and offset therefrom. Each of the locking feet defines an arcuate length L2. In one embodiment, arcuate length L2 is substantially equal to or less than arcuate length L1. Plate 30 defines a diameter D4 extending between the outer edges of a set of opposing locking feet 34. Locking feet 34 are preferably offset from body 32 a distance sufficient to define a height H1 between lower surfaces 36 of locking feet 34 and upper surface 38 of body 32.

Socket assembly 10 further includes a bottom plate 40 secured to the lower edge of ring 20, thereby forming a closed cup-like structure. In one preferred embodiment, plate 40 is welded to ring 20.

Socket assembly 10 further includes a plurality of locking inserts 50 sized for insertion within notches 24. Each of inserts 50 preferably includes a centrally-positioned threaded aperture 52 for extracting inserts 50 from notches 24 using a threaded tool (not shown).

To assemble socket assembly 10, plate 30 is positioned above ring 20 such that locking feet 34 are oriented with notches 24. As mentioned hereinabove, the arcuate length L2 of each of the locking feet is substantially equal to or less than the arcuate length L1 of each of the notches such that plate 30 can be positioned inside of ring 20 until lower surfaces 36 of locking feet 34 contact the upper edge of lip 28. Height H1 is preferably preconfigured such that surface 38 of body 32 is substantially planar with the upper surface of flange 22 when plate 30 is positioned inside of ring 20. Once plate 30 is positioned inside of ring 20, plate 30 is rotated approximately 45° whereby locking feet 34 are located below shoulders 23. As a result, each of the locking feet is contained between the lower surface of shoulder 23 and the upper edge of lip 28, thus preventing movement of plate 30 in a direction perpendicular thereto.

To prevent rotation of plate 30 during operation, locking inserts 50 are positioned in the openings defined by notches 24. The side edges of locking feet 34 contact the sides of locking inserts 50, thus preventing any rotation of plate 30. In one preferred embodiment, locking inserts 50 are secured in position by spring plungers 53, which extend between cavities 54 formed in plate 30 and cavities 55 formed in inserts 50.

Figure 4:
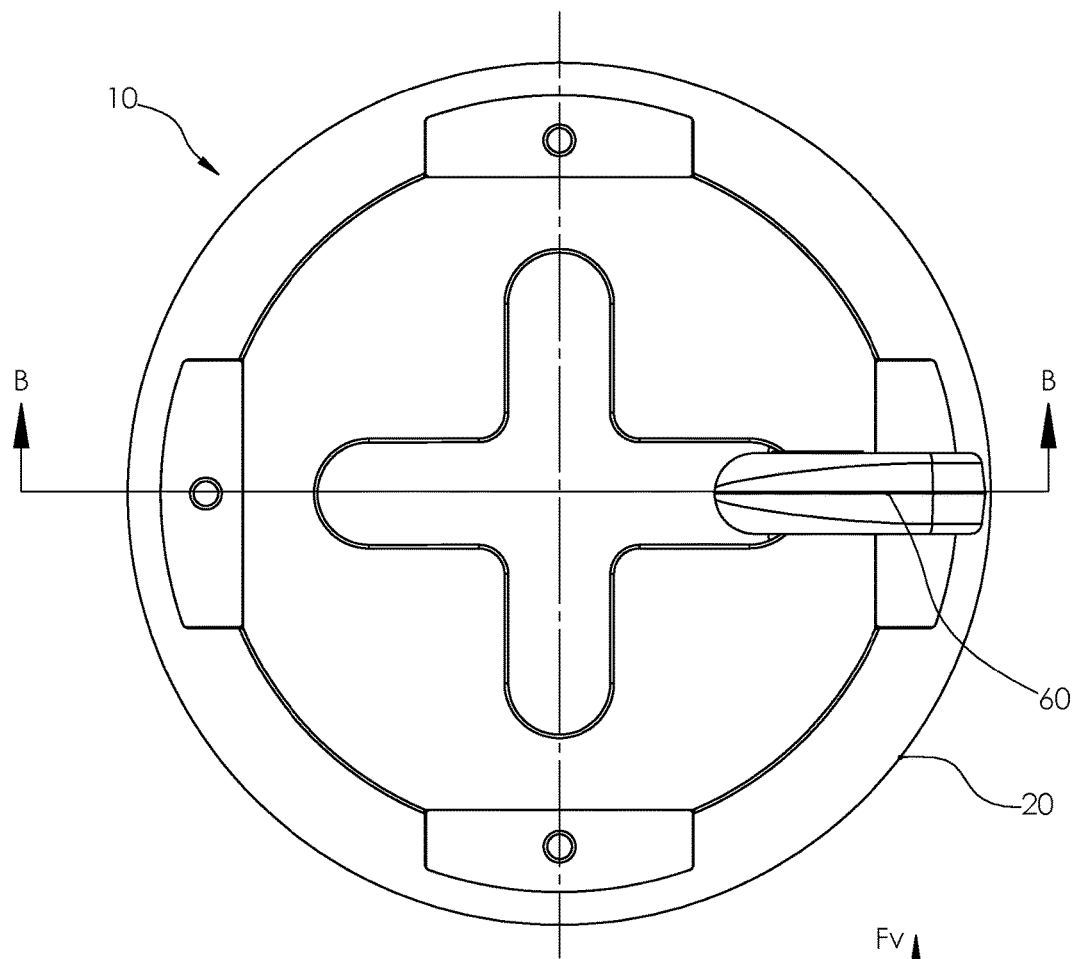
FIG. 4 is a top view of the fitting of FIG. 1 with a lashing hook aligned with one of the cloverleaf slots.
Figure 4A:
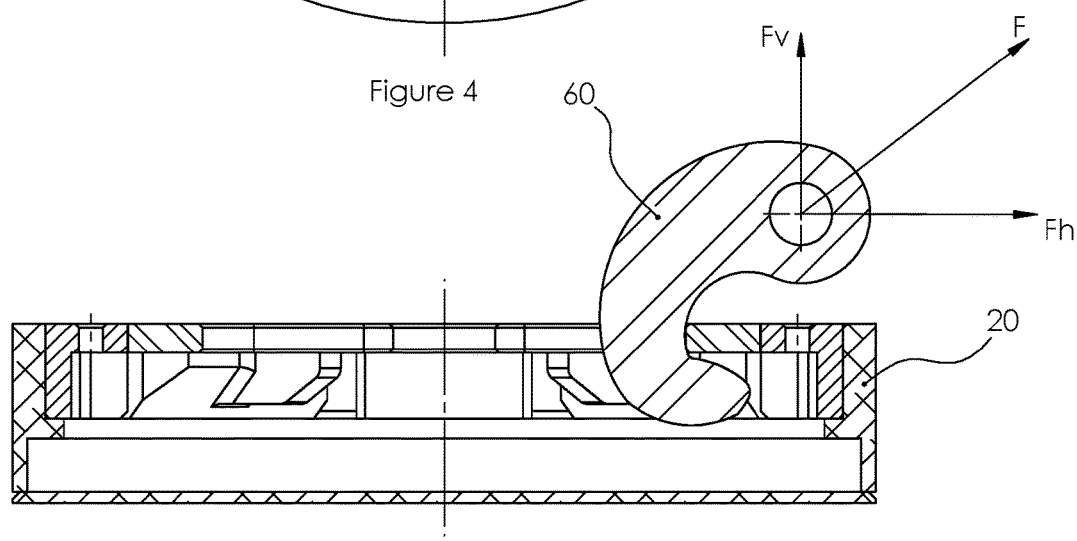
FIG. 4A is a cross-sectional view taken along lines B-B of FIG. 4.

Referring to FIGS. 4 and 4A, the novel design of the present invention reduces the stress experienced by ring 20 without reducing the load capacity of the socket assembly. More particularly, when a lashing hook 60 engages one of the cloverleaf slots and applies a resultant force F aligned with a plane of a symmetry, as shown, the actual resultant force F is equivalent to two forces projected to the vertical and horizontal axes, namely a vertical force Fv and a horizontal force Fh, appropriately. Each force Fv and Fh has a value less than actual force F, each of them being applied to a different plurality of vertical or horizontal surfaces, respectively. The vertical force Fv results in a transfer of load between the upper steel surfaces of locking feet 34 and the lower surfaces of aluminum shoulders 23 in the vicinity of the hook, and the Fh force results in a transfer of load between the steel cylindrical surfaces of body 32 and aluminum ring 20 in the vicinity of the hook. The load is then transferred to the deck of the vessel. As a result, the combined stress (compressive and tensile) generated by the vertical force Fv, and the compressive stress generated by the Fh, are transferred to a plurality of different contact surfaces of the lower surfaces of aluminum ring 20, resulting in reduced levels of experienced stress in the aluminum ring 20. As will be appreciated by those skilled in the art, reduced levels of experienced stress provide longer and safer service life for the socket assembly, particularly when formed of aluminum.

Figure 5:
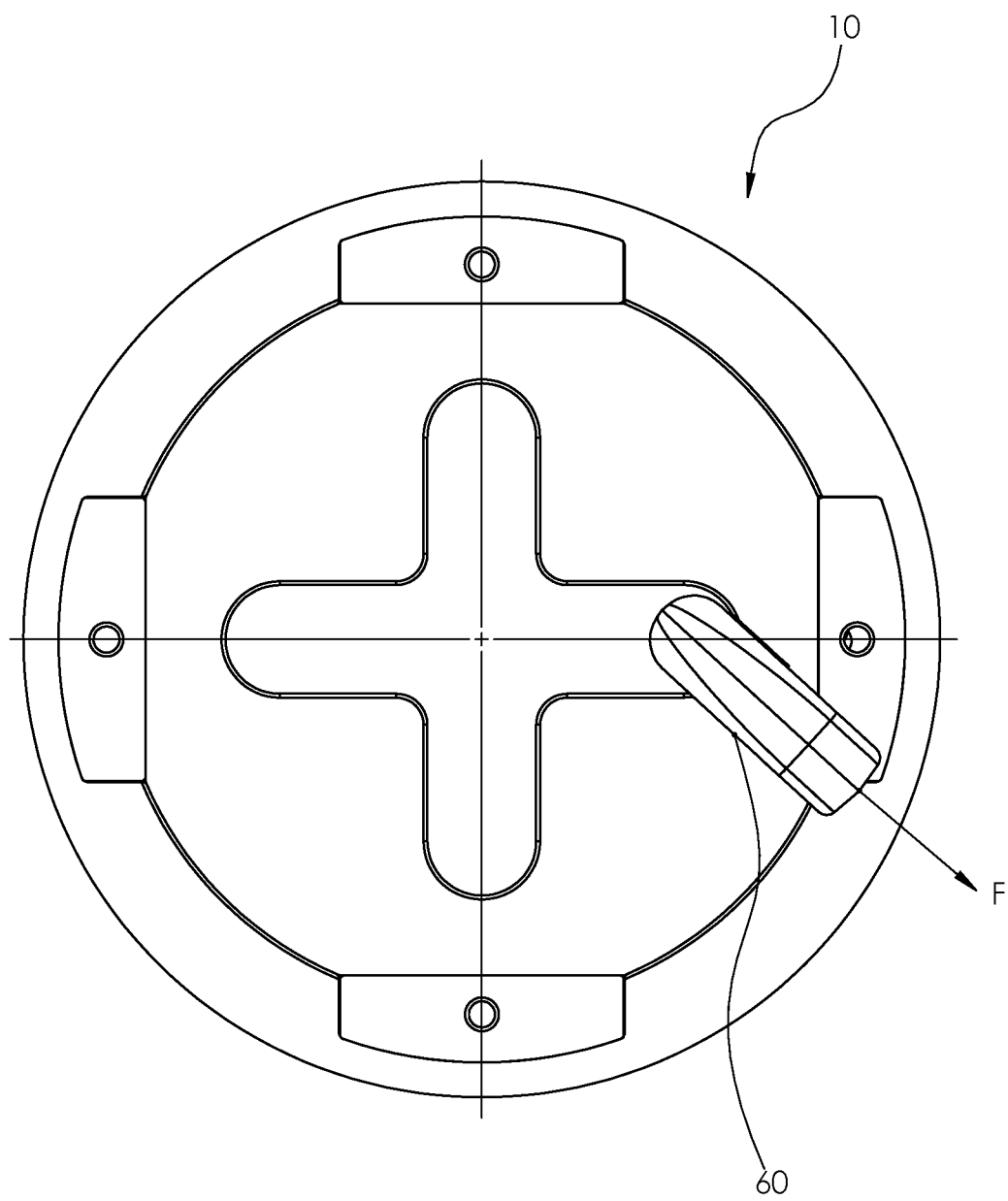
FIG. 5 is a top view of the fitting of FIG. 1 with a lashing hook installed in one of the cloverleaf slots and rotated at an angle to the slot.

If the hook 60 is angled with respect to the symmetry plane of the cloverleaf slot as shown in FIG. 5, the force Fh will impart a torque on plate 30. This torque, and any undesired rotation, is resisted by the interaction of the side edges of locking feet 34 and the side walls of locking inserts 50.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendments and/or deviations be included in the scope of the present invention.

What is claimed is:

1. A cargo lashing fitting for affixing to a deck of a transportation vehicle, said deck including at least one opening therein, said fitting configured to cooperate with an engagement end of a lashing gear assembly, said fitting comprising:

a housing sized for insertion within said opening in said deck, said housing defining outer and inner circumferentially-extending walls, said outer wall being configured for securement to said deck, said housing including a circumferentially-extending flange located at an end thereof and having a plurality of shoulders spaced thereabout, said shoulders defining a plurality of notches therebetween, said shoulders further defining an opening, said inner wall of said housing including support structure positioned thereabout;

a securing plate removably positionable within said housing, said securing plate including a plurality of locking feet positioned thereabout and offset therefrom, said locking feet oriented to substantially align with said notches in said housing to allow said securing plate to be positioned in and removed from said housing, said locking feet having an outer diameter sized to engage and rest upon said support structure located on said inner wall of said housing; and a plurality of locking inserts sized for insertion within said notches and sized to contact edges of said locking feet when said securing plate is oriented to circumferentially align said locking feet with said shoulders whereby said securing plate is retained within said housing.

2. The fitting according to claim 1, wherein said opening in said deck and said opening in said housing are generally circular, and wherein said housing is formed with a generally circular cross-section, and wherein said shoulders are equally sized and equally-spaced about said flange, and wherein said opening in said housing defines a diameter D1, said inner wall of said housing having a diameter D2, said notches being configured to align with said inner wall whereby a pair of opposing ones of said notches defines a diameter D2, and wherein said locking feet define an outer diameter D4.

3. The fitting according to claim 2, wherein said support structure defines a diameter D3, and wherein said diameter D4 is greater than said diameter D3 whereby said locking feet of said securing plate slidably engage and rest upon said support structure.

4. The fitting according to claim 3, wherein said support structure is a continuous circumferentially-extending lip located on said inner wall of said housing.

5. The fitting according to claim 4, wherein said housing further includes a bottom plate to provide said housing with a cup-like configuration.

6. The fitting according to claim 1, wherein said housing is formed from a material having welding compatibility with said deck.

7. The fitting according to claim 6, wherein said housing and said securing plate are formed of aluminum.

8. The fitting according to claim 1, wherein each of said inserts includes a locking mechanism for releasably securing said insert to said housing when positioned in a respective one of said notches.

9. The fitting according to claim 8, wherein said locking mechanism includes at least one spring plunger.

10. The fitting according to claim 9, wherein said securing plate includes a plurality of cavities formed in an edge thereof for receipt of said at least one spring plunger.

11. The fitting according to claim 9, wherein each of said inserts includes an aperture sized and configured to receive an installation tool.

12. The fitting according to claim 2, wherein said securing plate includes a substantially planar body having a cloverleaf opening formed therein to releasably engage said end of said lashing gear assembly.

13. The fitting according to claim 2, wherein each of said notches defines an arcuate length L1, and wherein each of said locking feet defines an arcuate length L2, and wherein L2 is substantially equal to or less than L1.

* * * * *